United States Patent [19]
Snee

[11] Patent Number: 6,113,779
[45] Date of Patent: Sep. 5, 2000

[54] ELECTRICAL WATER PURIFICATION APPARATUS

[75] Inventor: Thomas M. Snee, Eagan, Minn.

[73] Assignee: Des Moines Five, Inc., Selma, Tex.

[21] Appl. No.: 09/023,878

[22] Filed: Feb. 13, 1998

Related U.S. Application Data

[63] Continuation of application No. 08/340,743, filed as application No. PCT/US97/00885, Jan. 17, 1997, Pat. No. 5,603,843.

[51] Int. Cl.$^7$ .................................................. C02F 1/467
[52] U.S. Cl. .................. 210/138; 204/229.4; 204/248; 204/269; 204/293; 210/192; 210/199; 210/205
[58] Field of Search .................. 204/248, 267, 204/269, 292, 293, 229.4; 205/746, 743, 751, 752; 210/748, 192, 205, 199, 138

[56] References Cited

U.S. PATENT DOCUMENTS

| | | | |
|---|---|---|---|
| 3,092,566 | 6/1963 | Negus | 204/152 |
| 3,752,747 | 8/1973 | Treharne et al. | 204/149 |
| 3,992,146 | 11/1976 | Fazzalari | 21/58 |
| 4,038,163 | 7/1977 | Casanovas et al. | 204/152 |
| 4,161,435 | 7/1979 | Moeglich | 204/152 |
| 4,263,114 | 4/1981 | Shindell | 204/149 |
| 4,492,618 | 1/1985 | Eder | 204/152 |
| 4,717,450 | 1/1988 | Shan | 162/29 |
| 4,790,946 | 12/1988 | Jansen | 210/748 |
| 4,917,782 | 4/1990 | Davies | 204/152 |
| 5,007,994 | 4/1991 | Snee | 204/240 |
| 5,167,777 | 12/1992 | Kaczur et al. | 204/152 |
| 5,245,111 | 9/1993 | Betz | 204/152 |
| 5,314,589 | 5/1994 | Hawley | 204/128 |
| 5,376,240 | 12/1994 | Kaczur et al. | 204/128 |
| 5,435,894 | 7/1995 | Hayakawa | 204/149 |
| 5,603,843 | 2/1997 | Snee | 210/748 |
| 5,685,994 | 11/1997 | Johnson | 210/748 |

OTHER PUBLICATIONS

R.N. Lowry, "Copper Sulfate," *Canadian Pool & Spa Marketing*, Winter, 9 (1991).
Intec Corporation, "The Eliminator Well Water Intallation," technical sheet.
Matt–Son Inc., "Filtering Media," technical sheet.
Pyrolox Questions and Answers, 1, Form 050291.

*Primary Examiner*—Peter A. Hruskoci
*Attorney, Agent, or Firm*—Vidas, Arrett & Steinkraus, P.A.

[57] ABSTRACT

An apparatus for water treatment, and in particular for electrical water purification in combination with a filtering apparatus for providing purified water for drinking and other application common in the home, farm or business. Metal, hydrogen and oxygen ions are introduced into water to be treated by using plasma fused iridium coated titanium electrodes and copper alloy electrodes. After ionizing the water to be purified, the water is then filtered in a filter tank which contains layers of various filtration media, including granular activated carbon.

6 Claims, 3 Drawing Sheets

ELECTRICAL WATER PURIFICATION APPARATUS

CROSS REFERENCE TO RELATED APPLICATIONS

This application is a continuation of application Ser. No. 08/340,743 filed Nov. 16, 1994, now U.S. Pat. No. 5,603,843, which is a 371 of PCT/US97/00885, filed Jan. 17, 1997.

TECHNICAL FIELD OF THE INVENTION

The present invention relates generally to water purification, and more particularly to electrical water purification apparatus and methods.

BACKGROUND OF THE INVENTION

U.S. Pat. No. 5,007,994 to Snee, entitled "Water Purification System," discloses a water purification system using a pair of carbon electrodes and a pair of copper electrodes submersed in the water to be filtered. When a potential is applied across these electrode pairs, the copper electrodes release copper ions, while the carbon cathode produces hydrogen ions and the carbon anode produces oxygen ions. These ions produce a beneficial water treatment effect. Carbon electrodes are, however, subject to wear and have a limited life. Copper ions can result in staining of surfaces coming into contact with the treated water. The present invention provides improved electrode designs for both the carbon and copper electrodes, and an improved water treatment system and method.

SUMMARY OF THE INVENTION

According to one exemplary embodiment of the invention, there is provided a water filtration system and including a pair of electrodes at least one of which comprises a plasma fused iridium coated titanium electrode used for the purpose of creating oxygen, hydrogen, and hydroxyl ions in the treatment of water. According to another aspect of the invention, a pair of electrodes formed of a copper, zinc and aluminum alloy provides copper, zinc and aluminum ions for the control of algae and bacteria. The zinc ions also help reduce copper staining. The invention further provides a water filtration system and method using these electrodes.

DETAILED DESCRIPTION OF THE INVENTION

Figure 1:
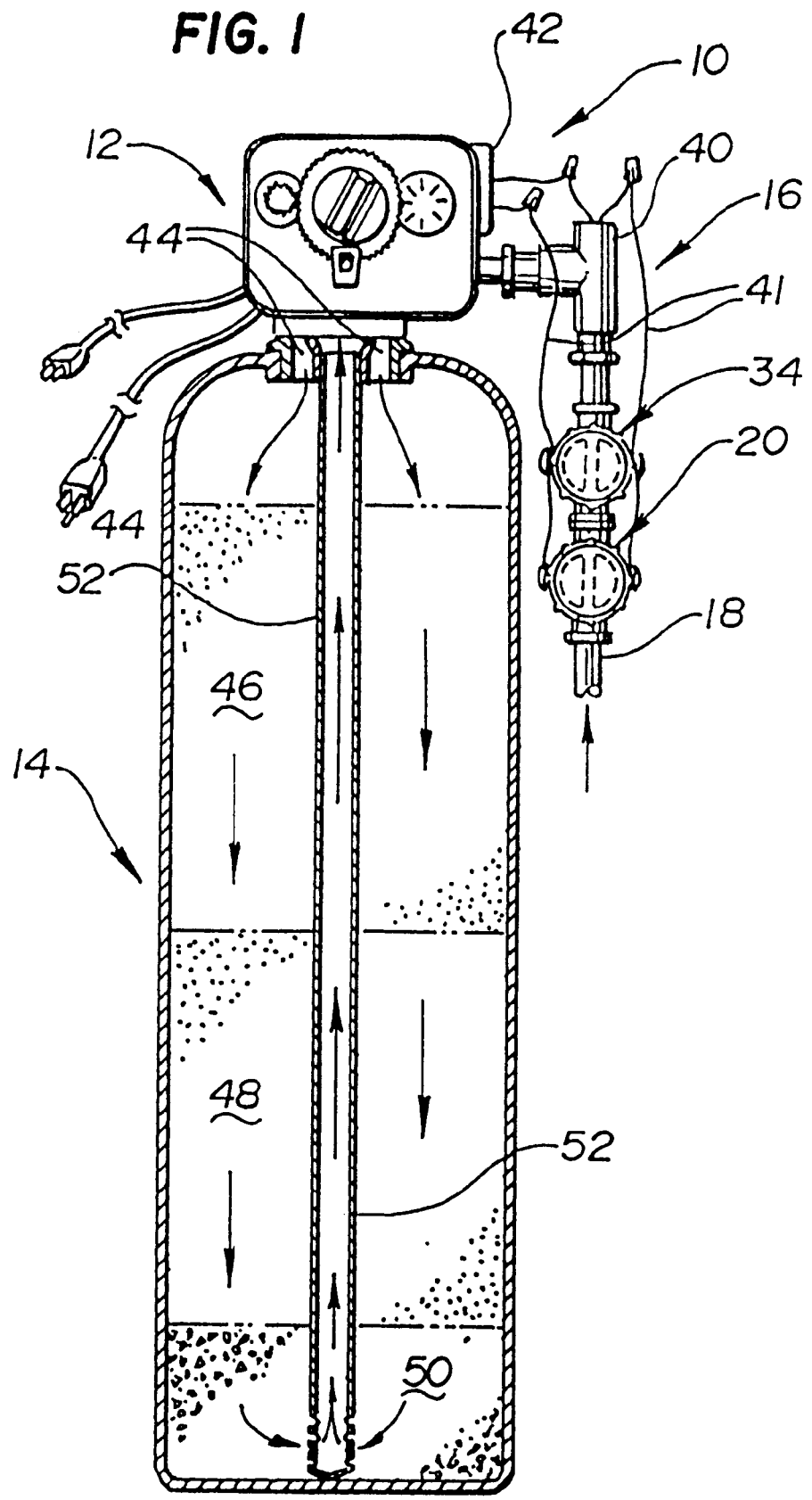
FIG. 1 is a section view of the filter tank showing the ionization chambers and the pressure switch attached thereto.

With reference to the drawings, and in particular to FIG. 1, the water purification system of the present invention is generally indicated by reference numeral 10. With the exception of electrode fabrication and design, and filtration media, the system is substantially identical to that described in U.S. Pat. No. 5,007,994 to Snee, referred to above, the entire disclosure of which is hereby incorporated by reference. The major elements of the system are the filter tank 14 and the ionization system 16, with the filter tank 14 having a control unit 12 mounted thereon.

Incoming water to be purified enters the water purification system 10 through incoming water supply line 18. Water entering the system for purification may be from either a local well, as in many rural applications, or it may be supplied by a municipal water system. As water to be purified is introduced into the water purification system 10, it first encounters the ionization system 16, shown most clearly in FIG. 2. In the instance where the water to be purified is from a local well or other water supply with an unusually high level of iron or other similar minerals such as manganese, a secondary ionization chamber 20 will be provided through which the water will initially enter the system. Flow arrows represent the general direction of flow of the water to be purified in the system. As may be seen in FIG. 2, water enters the secondary ionization chamber 20 through the inlet port 22 of a commercially available modified T joint 24. The T joint 24 directs the flow of water into the secondary ionization chamber 20, which contains two plasma fused iridium coated titanium electrodes 28 attached to the secondary ionization chamber housing 26 by means of conductive screws 30. The vapor coating of a titanium metal electrode with an alloy of iridium metal allows for a bonding of iridium to the titanium substructure to provide a surface coating of conductive material that is not subject to normal breakdown and emission of metals into the water. Titanium by itself rapidly oxidizes and in doing so becomes non-conductive. The iridium coating is not subject to such oxidizing and has a long useful life. In the preferred embodiment, the electrodes 28 are bars. Alternatively, one or both of electrodes 28 can be simply solid carbon or carbon/graphite bars. After flowing through the secondary ionization chamber 20 as depicted by the flow arrows, the water exits the secondary ionization chamber 20 via the outlet port 32 of the modified T joint 24.

Figure 2:
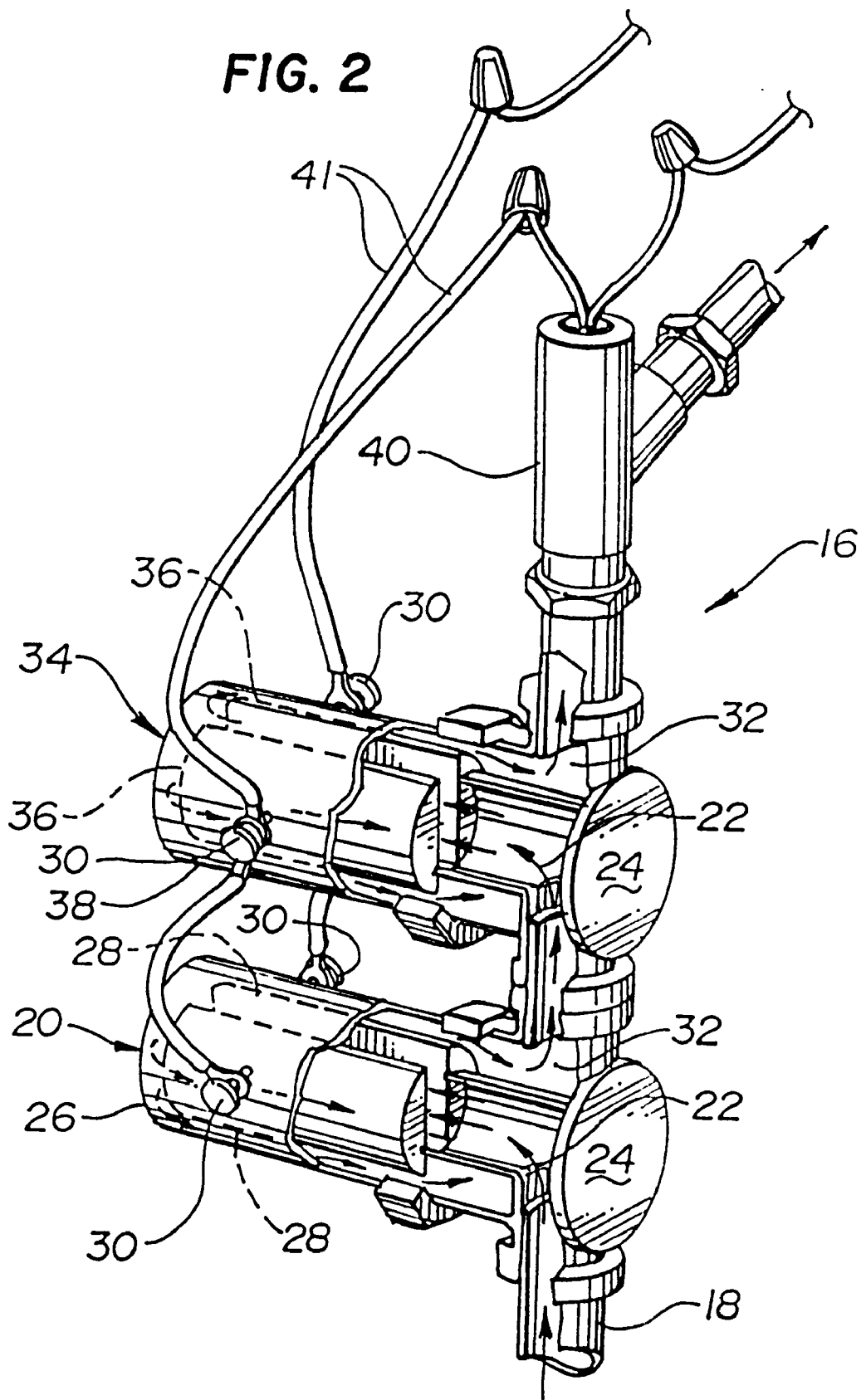
FIG. 2 is a fragmentary side elevation view on a larger scale showing the ionization chambers.

Still referring to FIG. 2, in systems where water to be purified has already been treated by a municipal water system, or where the water has already circulated through the secondary ionization chamber 20, water enters ionization chamber 34 through the inlet port 22 of a second modified T joint 24. As with the secondary ionization chamber 20, the T joint 24 directs the flow of water into ionization chamber 34, which contains two copper alloy electrodes 36 attached to the ionization chamber housing 38 of ionization chamber 34 by means of conductive screws 30. In the preferred embodiment, electrodes 36 are composed of copper with zinc and possibly aluminum, described in more detail below. Alternatively, the electrodes 36 can be made of pure 110 copper, in the form of solid copper bars. Alternatively, after flowing through the copper electrode ionization chamber 38 as depicted by the flow arrows, the water exits the copper electrode ionization chamber 38 via the outlet port 32 of the modified T joint 24.

Figure 3:
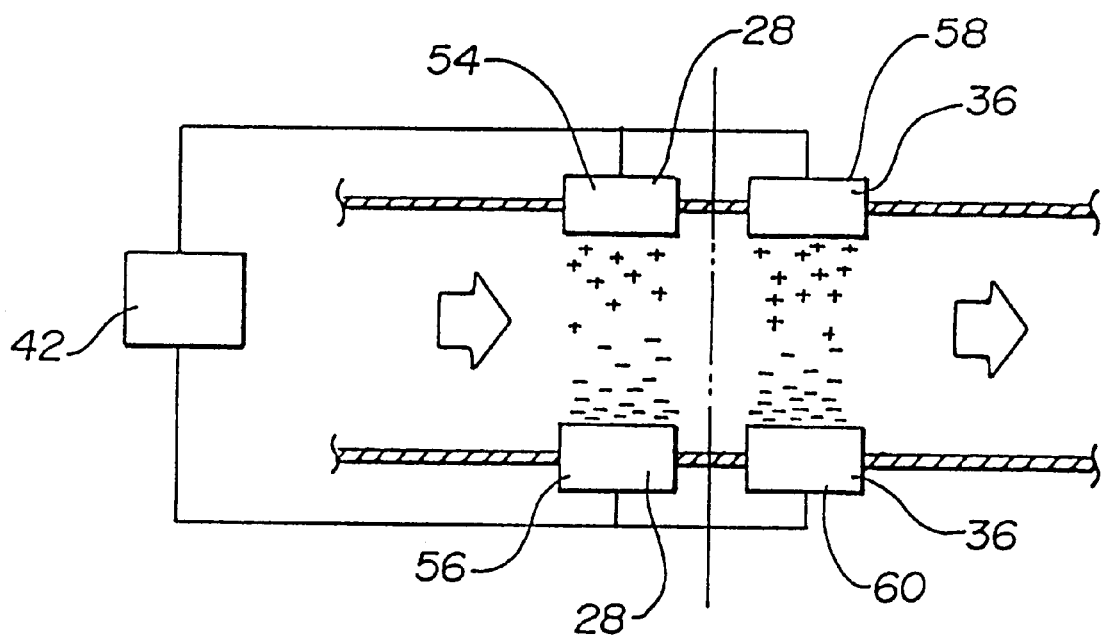
FIG. 3 is a schematic illustration of the ionization chambers.

The electrodes 28 and 36 are activated by means of a flow switch 40 which alternatively can be implemented as a passive switch if required. As water flowing through the system is detected by the switch 40, a circuit therein is closed providing electrical power to the electrodes 28 and 36 by means of a wire 41 connecting the conductive screws 30 with the source of the electrical power, an ion controller located on the back of the control unit 12. The ion controller is represented schematically in FIG. 3 with reference numeral 42. This ion controller 42 converts conventional AC power to DC, and reverses the direction of the DC current approximately every five minutes to minimize electrode wear. The electrical current supplied by the ion controller 42 results in a level of approximately 0.5 ppm (parts per million) of copper in the water as supplied by the copper electrodes 36. The switch 40 may be located either between the primary ionization chamber 34 and the filter tank 14, or, where high levels of corrosive contaminants are found in the water to be purified, it may be located on the water line containing purified water leaving the filter tank. In certain applications switch 40 will not be used, as in where the supply of DC current is tied in to the activation of a pump supplying water for the structure being serviced.

After passing through the ionization system 16, water undergoing purification enters the filter tank 14 via a filter tank inlet port 44. According to one exemplary embodiment, there are three layers, or regions, of filtration media in the filter tank 14. Referring to FIG. 1, the first and uppermost layer 46 comprises granular activated carbon (G.A.C.). This is the first layer of filtration media encountered by the water being purified. The second layer of filtration media 48 preferably of about equal proportion to the first layer, is comprised of manganese dioxide ($Mg_2O_3$). The third and final layer of filtration media 50 comprises gravel. In an alternative embodiment, oyster shells or some other calcite may be used as a pre-filter for pH increase. In the preferred embodiment there are no membranes or other barriers dividing the various regions of filtration media in the filter tank. These are unnecessary as the various layers maintain their relative positions due to the effect of their relative densities and masses. Alternatively, another exemplary preferred embodiment of the invention provides that hydroxite is used as a substitute for manganese dioxide. Hydroxite is a special blend of insoluble natural minerals to filter and remove contaminants. As explained further below, hydroxite, sold under the brand name Pyrolox™ for example, is a super oxidation media, with the highest oxidation capabilities of any media on the market. It is a high purity, natural mineral specialty processed to enhance and promote its function as a high capacity media for water filtration.

After passing through the filtration media, the water undergoing treatment or purification is drawn into the purified water distributor 52 and drawn out of the tank, from which it departs through the filter tank outlet port, and goes on to enter the water system of the structure in which it is located.

The control unit 12 is activated manually or by an integral timer. The timer periodically activates the control unit 12, which initiates a backwash, or regeneration, cycle within the filter tank. The backwash cycle is required to remove any substances that have been filtered out of the purified water during purification which have been trapped in the layers of filtration media. This is important because the backwash cycle serves to remove contaminants that have accumulated in the various layers of filtration media in the filter tank 14. If contaminants are allowed to build up, the filtration media will become ineffective, allowing contaminants to pass through the filter tank and into the water system. Backwash is accomplished automatically by forcing water down the distributor 52 and then through the layers of filtration media in a direction opposite to that of the flow arrows shown in FIG. 1. The backwash fluid is then forced out of the system through a drainage valve which is linked directly to the sewer system by means of a small hose. During the backwash cycle, a valve in the control unit 12 is rinsed, thereby not allowing any of the backwash to be inadvertently forced into the water supply of the system for which the water is being purified. It is important that the backwash cycle be operated on a periodic basis. The automatic backwash is preferably programmable to operate daily or only on preselected days up to once every twelve days. Preferably, the system also has a manual backwash option for city and well water with low levels of silt and sediment and no problem with iron or manganese (backwashing gives added protection from possible bacteria and chemical or sediment buildup). The system can also be provided with upflow non-backwash operation for purification of municipal treated water.

In operation, when water is drawn from the system being serviced by the water purification system of the invention, as from a household faucet, water is thereby drawn through the water purification system. This flow of water is detected by the switch 40, and DC electrical current is then provided to the ionization chambers from the ion controller 42 located in the control unit 12. Where a secondary ionization chamber 20 has been installed as part of the water purification system 10, the activation of the electrodes 28 causes the generation of hydrogen ions by the cathode 54 and oxygen ions by the anode 56, as represented schematically in FIG. 3. Likewise, the activation of the electrodes 36 causes the generation of hydrogen ions by the cathode 58 and oxygen and copper, zinc (and aluminum if present) ions by the anode 60 in the case where anode 60 is the copper, zinc (and aluminum, if present) alloy, or copper ions only if the anode 60 is pure copper. The oxygen ions generated by the anodes combine with dissolved iron and manganese in the water to be purified which are, as the sulfur particles, later filtered and removed in the filter tank. Likewise, the hydrogen ions help calcium bicarbonate ions hold onto their hydrogen atoms and not convert into calcium carbonate ions (scale) when heated. This is beneficial because calcium carbonate tends to contribute to the scaling of water heaters, pipes and other plumbing appliances. Further, "neutral" particles like silica or alumina tend to pick up a negative charge as they pass by the electrodes. Normally these particles help form hard scale by binding calcium and magnesium carbonate together. However, the negative charges they pick up from the electrodes cause the particles to repel each other and prevent the binding effect. The copper ions created by the electrodes kill off algae and bacteria, which are then removed from the water in the filter tank. Likewise, these copper ions also tend to strip the bonding properties of the existing hard scale within pipes and fixtures, and thereby reduce the scale as it wears away over time. The zinc ions help the copper ions as a fungicide and algicide, and help displace copper ions to reduce copper staining, as explained in more detail below.

After passing through the ionization system 16, the water to be purified enters the filter tank 14. In the filter tank 14, the water passes through the GAC layer 46, then the manganese dioxide layer 48, and finally the gravel layer 50 or alternatively, through the mix of GAC, Hydroxite, and gravel. While passing through the granular activated carbon layer 46 or the Hydroxite, the water deposits chlorine, VOCs (volatile organic chemicals), and many other contaminants. This layer is effective because most natural and man-made organic chemicals will be filtered from the water. By activated carbons ability to absorb and adsorb these chemicals. Activated carbon is also effective in removing radon gas from water. The manganese dioxide layer 48 is most effective in the removal of iron particles. The gravel/calcite layer 50 serves to help maintain a neutral or higher pH balance for water that has been purified by the system, as well as helping to maintain a relatively high level of beneficial calcium bicarbonate, and a relatively low level of calcium carbonate, which leads to calcium hardness or scaling in pipes and plumbing appliances. Hydroxite is very similar to activated carbon in that it is highly porous with an extremely large surface area. The high porosity allows hydroxite to address and effectively remove iron, manganese, hydrogen sulfide, arsenic, barium, lead, mercury and other heavy metals and contaminants along with chlorine. Hydroxite is relatively new for general water treatment but has been used for industrial applications for years. Typical applications include metal removal, taste and odor control, turbidity reduction, dechlorination and to extend GAC carbon bed life. Hydroxite works on the principle of catalytic oxygen reaction, which means it causes and promotes reactions but itself remains unchanged. This reaction is accomplished by the formation of oxygenated compounds, such as oxides of iron and manganese. Hydroxite promotes oxygenation whereby hydrogen sulfide, iron and manganese are attracted to the media and held on the surface of the Hydroxite until simple backwashing cleans the bed. No chemical regeneration is required, nothing is imparted into the drinking water and essentially unlimited capacity for removal of low level contaminants is possible. Hydroxite works equally well in pH ranges of 6 to 9. However, if you have a pH of 6 or under, it would be helpful to neutralize the water to 7. The level of sulfur or iron does not affect the performance. Manganese at high levels, with low pH, extra dwell time may be needed. The higher the pH the better the manganese removal, i.e., a 7 to 8 pH is ideal for manganese removal. The lower the pH the better the iron removal.

After filtering though these regions of the filter tank 4, the now purified water enters the water distributor 52, and is drawn into the water system of the establishment or water use being serviced.

Since various water system may have specific needs or problems with which to deal in various applications, the water purification system 10 may be varied in certain particulars, including the size of the filter tank 14 and the relative amounts of filtration media placed within the filter tank 14. As noted above, electrodes 36 are preferably composed of copper with zinc and sometimes aluminum. Preferably, a copper and zinc electrode is 20–40% zinc and 60–80% copper. If aluminum is included, it is approximately 10%. When power in the form of low voltage direct current is applied to these electrodes they will emit metal ions as copper ions (plus 2), zinc ions (plus 2); and, if present, aluminum ions plus (3). The coppers primary function is as an algicide and bactericide. Copper in its pure ionic and uncombined form is approximately five times more active and effective than copper in a chemical form such as copper sulfate. Copper based algicides typically are celated or bound to other chemicals to minimize their potential for staining surfaces the water is in contact with. Due to the staining potential of copper, particularly with concrete swimming pools, careful use and precautions are needed, water balance and pH are very important. Copper's staining is in the form of blue, bluish green, black or various shades of grey. Zinc has been accepted and used for control of mildew and fungus. Mildew, when in a body of water, would be considered algae; therefore, zinc in effect is an algicide. Generally zinc is not a commonly used algicide. At present, based on testing conducted to date, zinc does not appear effective to control bacteria by itself. However, zinc in the make-up of the electrodes is to support the copper ions as an algicide, thus reducing the level of copper usage and reducing potential staining. The secondary and more important function of zinc is in its ability to displace copper and prevent staining. The electronegativity of zinc is greater than copper and will displace copper when oxidized or in the form of a stain. Aluminum is used as a flocking agent to cause other chemicals to come out of solution and to cause existing negatively charged contaminants to precipitate.

It is anticipated that various changes may be made in the size, shape, and construction of the water treatment system disclosed herein without departing from the spirit and scope of the invention as defined by the following claims.

What is claimed is:

1. A water treatment apparatus, comprising: an ionization chamber containing two spaced apart ion-producing electrodes and having an inlet port and an outlet port, said inlet port being connected to an incoming water line for supplying water to be treated to said chamber, and said inlet port and said outlet port being so arranged in separate, fluid flow communication with said chamber that water to be treated from said incoming water line will pass through said inlet port and around said ion-producing electrodes before flowing out of said chamber through said outlet port; and at least one of said ion-producing electrodes of said ionization chamber comprises plasma fused iridium coated titanium, the apparatus further comprising an ion controller, wherein one electrode acts as an original anode and the second electrode acts as an original cathode, the electrodes being positioned in the same chamber so that untreated water may be passed over each of the electrodes in a water treatment process, the ion controller being constructed and arranged to periodically reverse the direction of the current to the electrodes and change the polarity of the electrodes during a water treatment process so that the original anode becomes a cathode and the original cathode becomes an anode, to minimize electrode wear.

2. A water treatment apparatus according to claim 1 further including a filter tank containing a hydroxite filter media, the filter tank connected to the outlet port whereby said water to be purified from said incoming water line passes through said ionization chamber before entering said filter tank, and then passes first through said hydroxite being discharged from said filter tank in a purified state.

3. A water treatment apparatus according to claim 1 further including another pair ion producing electrodes at least one of which comprises an alloy of copper and zinc.

4. A water treatment apparatus according to claim 3, wherein the at least one of the electrodes further comprises an aluminum alloy.

5. A water treatment apparatus according to claim 1 for including another pair ion producing electrodes at least one of which is comprises a plasma fused iridium coated titanium.

6. A water treatment apparatus according to claim 1, wherein both of said ion-producing electrodes of said ionization chamber comprise plasma fused iridium coated titanium.

\* \* \* \* \*